United States Patent
Andrew et al.

(10) Patent No.: US 9,882,224 B2
(45) Date of Patent: Jan. 30, 2018

(54) METHOD AND APPARATUS FOR FLEXIBLE BATTERY

(75) Inventors: Piers Andrew, Cambridge (GB); Pritesh Hiralal, Las Palmas (ES); Yinglin Liu, Cambridge (GB); Darryl Cotton, St. Ives (GB)

(73) Assignee: Nokia Technologies Oy, Espoo (FI)

( * ) Notice: Subject to any disclaimer, the term of this patent is extended or adjusted under 35 U.S.C. 154(b) by 959 days.

(21) Appl. No.: 13/590,724

(22) Filed: Aug. 21, 2012

(65) Prior Publication Data

US 2014/0057147 A1    Feb. 27, 2014

(51) Int. Cl.
*H01M 10/0587* (2010.01)
*H01M 6/40* (2006.01)
*H01M 10/14* (2006.01)
*H01M 10/12* (2006.01)
*H01M 10/04* (2006.01)
*H01M 2/02* (2006.01)
*H01M 10/0583* (2010.01)
*H01M 10/052* (2010.01)

(52) U.S. Cl.
CPC .......... *H01M 6/40* (2013.01); *H01M 2/0275* (2013.01); *H01M 10/045* (2013.01); *H01M 10/0431* (2013.01); *H01M 10/0436* (2013.01); *H01M 10/123* (2013.01); *H01M 10/14* (2013.01); *H01M 10/052* (2013.01); *H01M 10/0583* (2013.01); *H01M 10/0587* (2013.01); *H01M 2220/30* (2013.01); *Y10T 29/4911* (2015.01)

(58) Field of Classification Search
CPC .......... H01M 10/0587; H01M 10/123; H01M 10/14; H01M 10/0431

USPC .................................... 429/149–161
See application file for complete search history.

(56) References Cited

U.S. PATENT DOCUMENTS

| 4,051,304 A | 9/1977 | Snook ............................. 429/94 |
| 5,667,909 A | 9/1997 | Rodriguez et al. ........... 429/127 |

(Continued)

FOREIGN PATENT DOCUMENTS

| EP | 1 340 284 B1 | 8/2004 |
| EP | 2 445 043 A1 | 4/2012 |

(Continued)

OTHER PUBLICATIONS

Machine Translation of JP H10-270069 published to Yamamoto on Oct. 9, 1998.*

(Continued)

*Primary Examiner* — Jonathan G Leong
(74) *Attorney, Agent, or Firm* — Harrington & Smith

(57) ABSTRACT

In accordance with an example embodiment of the present invention, an apparatus is disclosed. The apparatus includes a single battery ribbon and vacuum packaging. The single battery ribbon includes a first portion, a second portion, and an interconnecting portion between the first portion and the second portion. The first portion includes a first block. The second portion includes a second block. The first portion, the second portion, and the interconnecting portion form a continuous single layer including an anode and a cathode. The vacuum packaging surrounds the single battery ribbon. The vacuum packaging includes a middle connecting portion configured to contact a first side of the interconnecting portion and a second opposite side of the interconnecting portion.

12 Claims, 8 Drawing Sheets

(56) References Cited

U.S. PATENT DOCUMENTS

| | | | |
|---|---|---|---|
| 6,040,085 A | 3/2000 | Cheu et al. | 429/185 |
| RE40,663 E | 3/2009 | Silverman | 307/43 |
| 2010/0203384 A1 | 8/2010 | West et al. | |
| 2010/0310932 A1 | 12/2010 | Martin et al. | 429/186 |
| 2011/0183169 A1 | 7/2011 | Bhardwaj et al. | 429/94 |
| 2012/0064382 A1 | 3/2012 | Ahn | |
| 2012/0135299 A1 | 5/2012 | Kwon et al. | 429/164 |

FOREIGN PATENT DOCUMENTS

| | | |
|---|---|---|
| EP | 2 469 620 A1 | 6/2012 |
| GB | 1 407 627 A | 9/1975 |
| JP | 1981/046973 U | 4/1981 |
| JP | H-01112652 A | 5/1989 |
| JP | 3010524 | 5/1995 |
| JP | H-10270069 A | 10/1998 |
| JP | 2003/510768 A | 3/2003 |
| JP | 2003100350 A | 4/2003 |
| JP | 2004/047369 A | 2/2004 |
| JP | 2010003803 A | 1/2010 |
| KR | 20100132453 A | 12/2010 |
| WO | WO-2007/118281 A1 | 10/2007 |
| WO | WO 2012053772 A3 * | 6/2012 ......... H01M 2/0202 |
| WO | WO-2012077707 A1 | 6/2012 |

OTHER PUBLICATIONS

European Patent Office's Machine Translation of JP H10-270069 originally published Oct. 9, 1998 to Yamamoto.*

"Flexible, Aligned Carbon Nanotube/Conducting Polymer Electrodes for a Lithium-Ion Battery", Jun Chen et al., Chem. Mater., vol. 19, No. 15, 2007, pp. 3595-3597.

"Nanomaterial-Enhanced All-Solid Flexible Zinc-Carbon Batteries", Pritesh Hiralal et al., ACSNANO, vol. 4, No. 5, Apr. 2010, pp. 2730-2734.

"A self-rechargeable and flexible polymer solar battery", G. Dennler et al.., Solar Energy 81, 2007, pp. 947-957.

"Flexible energy storage devices based on nanocomposite paper", Victor L. Pushparaj et al., PNAS, vol. 104, No. 34, Aug. 2007, pp. 13574-13577.

"Toward Flexible Batteries", Hiroyuki Nishide et al., Science vol. 319, Feb. 2008, pp. 737-738.

"Li-ion Lithium Ion Rechargeable Battery", Maxwell, May 2012, 5 pgs.

* cited by examiner

METHOD AND APPARATUS FOR FLEXIBLE BATTERY

TECHNICAL FIELD

The invention relates to a flexible battery and, more particularly, to flexible battery form factors.

BACKGROUND

As electronic devices continue to become more sophisticated, these devices provide an increasing amount of functionality and features, and additionally these devices continue to have different forms, such as dynamically flexible devices or mechanically conformable devices, for example. As consumers demand increased functionality from electronic devices, there is a need to provide improved devices having increased capabilities while maintaining robust and reliable product configurations.

SUMMARY

Various aspects of examples of the invention are set out in the claims.

According to a first aspect of the present invention, an apparatus is disclosed. The apparatus includes a single battery ribbon and vacuum packaging. The single battery ribbon comprising a first portion, a second portion, and an interconnecting portion between the first portion and the second portion. The first portion comprises a first block. The second portion comprises a second block. The first portion, the second portion, and the interconnecting portion form a continuous single layer comprising an anode and a cathode. The vacuum packaging surrounds the single battery ribbon. The vacuum packaging comprises a middle connecting portion configured to contact a first side of the interconnecting portion and a second opposite side of the interconnecting portion.

According to a second aspect of the present invention, a method is disclosed. A battery ribbon is gripped with mechanical rollers. Battery ribbon sections are rolled with the rollers. Vacuum packaging is applied to the rolled battery ribbon sections. Pinching in between the rolled battery ribbon sections. An evacuation process is performed on the vacuum packaging.

According to a third aspect of the present invention, a method is disclosed. A single battery ribbon comprising first portion, a second portion, and an interconnecting portion between the first portion and the second portion is provided. The first portion comprises a first rolled block. The second portion comprises a second rolled block. The first portion, the second portion, and the interconnecting portion form a continuous single layer comprising an anode and a cathode. Vacuum packaging surrounding the single battery ribbon is provided. The vacuum packaging comprises a middle connecting portion configured to contact a first side of the interconnecting portion and a second opposite side of the interconnecting portion.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 16 of the drawings.

Figure 1:
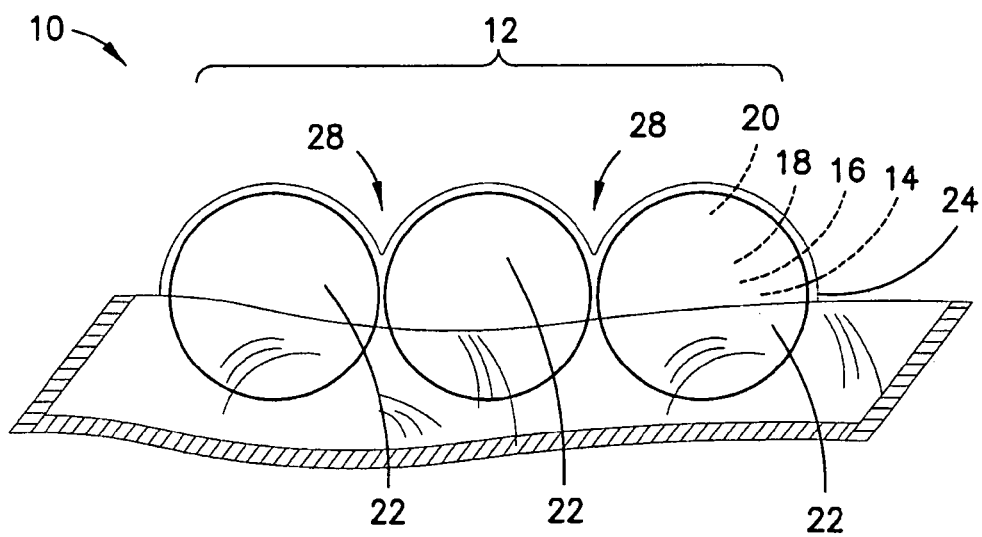
FIG. 1 is a side view of a flexible battery incorporating features of the invention.

Referring to FIG. 1, there is shown a side view of a flexible battery 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the flexible battery 10 may be used in a multi-function portable electronic device. However, in alternate embodiments, features of the various embodiments of the invention could be used in any suitable type of portable electronic device such as a mobile phone, a gaming device, a music player, a notebook computer, or a personal digital assistant, for example. In addition, as is known in the art, the portable electronic device can include multiple features or applications such as a camera, a music player, a game player, or an Internet browser, for example. It should be noted that in alternate embodiments, the portable electronic device can have any suitable type of features as known in the art.

The flexible battery 10 includes an electrode stack 12. The electrode stack 12 generally comprises a single battery ribbon 14 having an anode 16, a separator 18, and a cathode 20. The anode 16 and cathode 20 are generally thin metal foils (such as copper or aluminum, for example) acting as current collectors which are each coated with active electrode materials (such as carbon or lithium metal oxide, for example). The stack 12 comprises a 'swiss roll' architecture having three rolled structures 22. The flexible battery further comprises a pouch cell 24 (for vacuum packaging) surrounding the stack 12. However, it should be noted that the stack 12 is not required to have three rolled structures, and in alternate embodiments any suitable number of rolled structures may be provided. It should further be noted that various exemplary embodiments of the invention are not limited to a particular set of electrode materials, but is more a set of general architectures applicable to any suitable battery chemistry.

Figure 2:
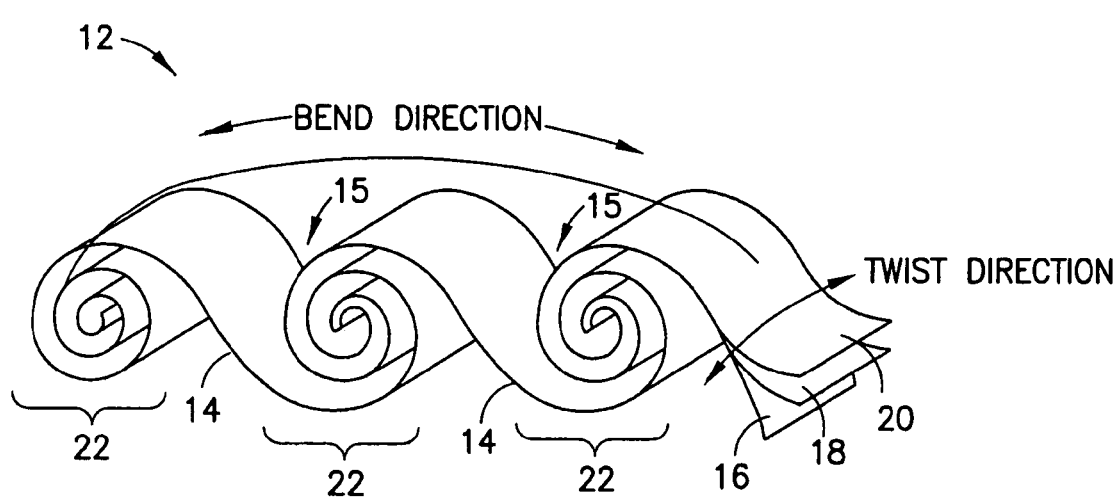
FIG. 2 is a view illustrating a 'swiss roll' architecture of the flexible battery shown in FIG. 1.

Referring now also to FIG. 2, there is shown the 'swiss roll' architecture of the stack 12 before it is vacuum packed. According to one example of the invention, the "swiss roll" architecture comprises a similar configuration to a conventional block Li-ion battery structure, but is further constructed from multiple rolls (or rolled structures) 22, linked together with a single thickness of ribbon (or single layer) 14. The single thickness of ribbon 14 which links the rolls together forms single ribbon linkages (or interconnecting ribbon) 15 between the rolls 22. The single layer or single thickness of ribbon 14 generally refers to a single stack of the anode, separator and cathode. As shown in FIG. 2, the 'multiple swiss roll structure' is formed by the continuous anode/separator/cathode stack rolled into multiple rolls, with flexible points, allowing for the control of the overall flexibility of the battery (or device). Although various exemplary embodiments of the invention have been described in connection with the anode, the cathode, and the separator between the anode and the cathode, one skilled in the art will appreciate that any suitable type of a physical separator between cathode and anode to reliably mechanically separate the anode and cathode could be provided.

Figure 3:
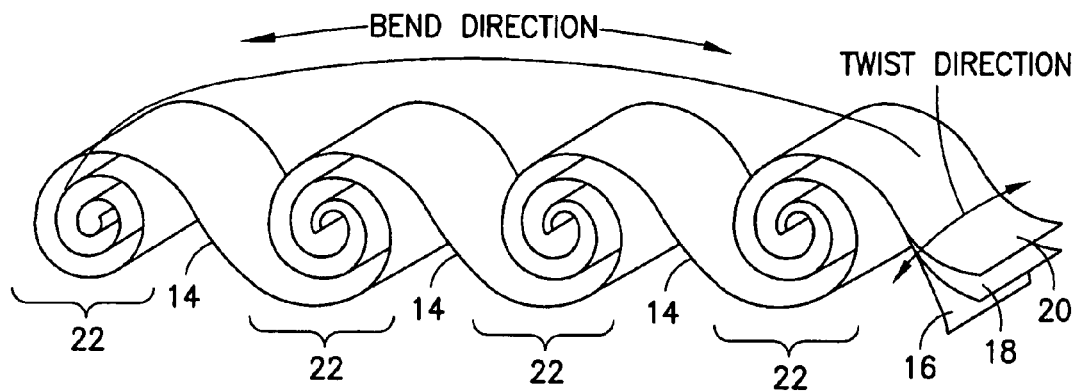
FIG. 3 is a view illustrating another example of a 'swiss roll' architecture of the flexible battery shown in FIG. 1.
Figure 4:
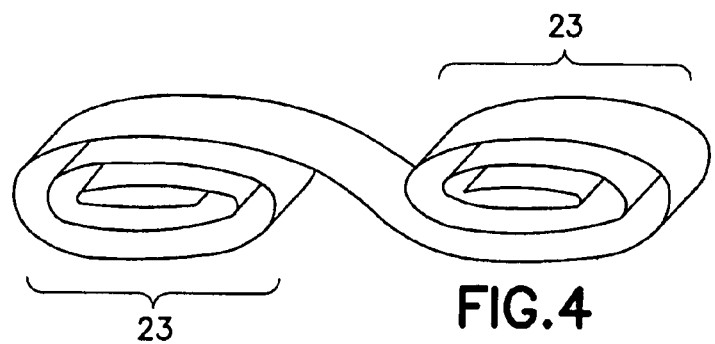
FIG. 4 is a view illustrating another example of a rolled structure of the flexible battery shown in FIG. 1.
Figure 5:
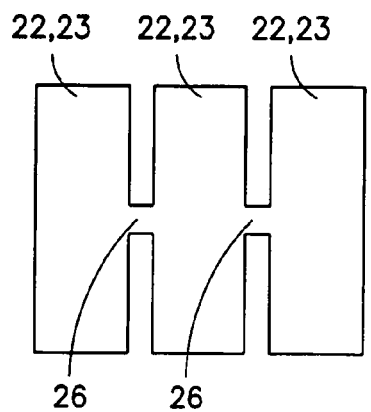
FIG. 5 is a plan view of a single ribbon of the flexible battery shown in FIG. 1.

It should be noted that although various exemplary embodiments of the invention have been described in connection with three rolled structures (or blocks) each having a general cylindrical shape, any other suitable number of rolled structures may be provided. Additionally, any other suitable shape for the rolled structures may be provided. For example, according to some embodiments of the invention, the flexible battery may include a stack having four rolled structures 22 as shown in FIG. 3. For example, according to some embodiments of the invention, the flexible battery may include a stack having two rolled structures 23 having a general rectangular shape as shown in FIG. 4. However, these are provided as non-limiting examples and any other suitable shape, and/or number of rolled structures, may be provided.

The single layer which interconnects the rolled structures permits mechanical flexure at that/those point(s), giving flexibility to the whole structure. The separation between each wound roll can be adjusted so as to fit the requirements of the particular device (for example, two rolls/folds can be segregated to either end of a device allowing the centre to flex, and fit additional components). The interconnecting layer is able to tolerate greater flexure since it is much thinner, and as a result experiences lower stresses than the full stack. Note that the stresses experienced in a given layer depend on the distance of that layer from the neutral plane associated with the bending. Generally the flexible linkers will be located in the same plane as each other, forming the neutral plane of the overall bending device and minimizing stresses.

It should be noted that although various exemplary embodiments of the invention have been described with the interconnecting ribbon (the portion of the ribbon between the rolled structures) 15 having a same width as the battery roll (or rolled structure), which generally provides for restricting twist of the electrode stack, some other embodiments of the invention may comprise an interconnecting ribbon with a reduced width to allow the required amount of twist depending upon the application. For example, referring now also to FIG. 5, there is shown a plan view of a single ribbon with a reduced width interconnecting single ribbon (or interconnecting ribbon) 26 to allow bending and twisting between the battery rolls (or rolled structures) 22, 23.

In general, the least flexure-tolerant parts of the battery ribbon are the active materials coated onto the anode and cathode. These materials are relatively brittle and can delaminate from the metallic current collector upon repeated flexure, and this is a major failure mechanism of flexible batteries. To alleviate this, the anode and cathode in the flexible regions (for example, at the reduced width interconnecting ribbon 26) of the battery may comprise the metal current collectors alone without the active coating, but with a separator between. This generally does not significantly affect the storage capacity of the battery, but will increase the flexure tolerance.

Figure 6:
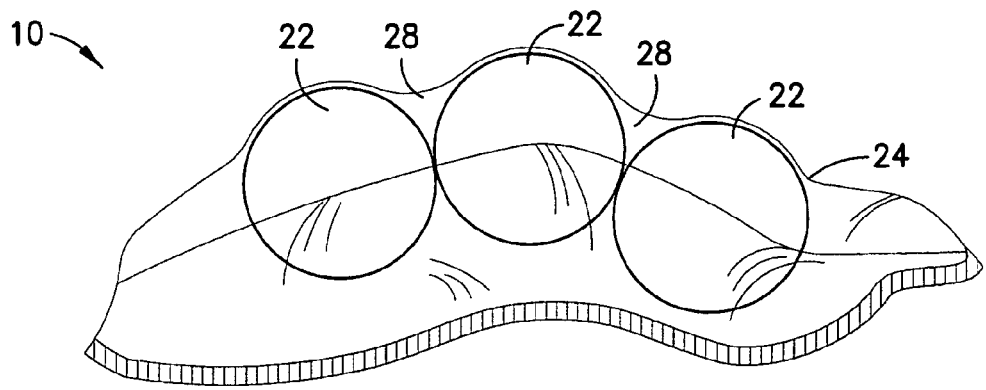
FIG. 6 is a side view of the flexible battery in a 'flexed' position.

Referring now also to FIG. 6, there is shown a side view of the flexible battery 10 in a 'flexed' position. The pouch cell 24 provides for vacuum packaging to surround the electrode stack, as the stack is generally packed tightly, in order to protect the stack from the external atmosphere (such as moisture and oxygen, for example). The vacuum packaging (or pouch cell) 24 also provides pressure to keep the electrodes pressed together to minimize the internal resistance. The vacuum packaging 24 includes middle connecting portions 28 have been pushed together to meet in the middle of each of the two cylinders 22 as shown in FIG. 1. The vacuum packaging is applied to the stack of electrodes in such a way that the 'grooves' between the rolled structures 22 are followed by the vacuum packaging (allowing for the vacuum packaging to substantially surround the entire circumference of the cylinder [such as by surrounding the entire circumference of the cylinder except at the interconnecting portions 15 of the battery ribbon]) to permit mechanical flexure. These middle connecting portions 28 allow for much better flexibility of the packaged device (as shown in FIG. 6) when compared to vacuum packing in conventional methods which would lead to a large gap between the battery ribbon and the vacuum packaging (such as when the packaging has been left to form around the cylinders without any interference) reducing the flexibility of the overall device.

Figure 8:
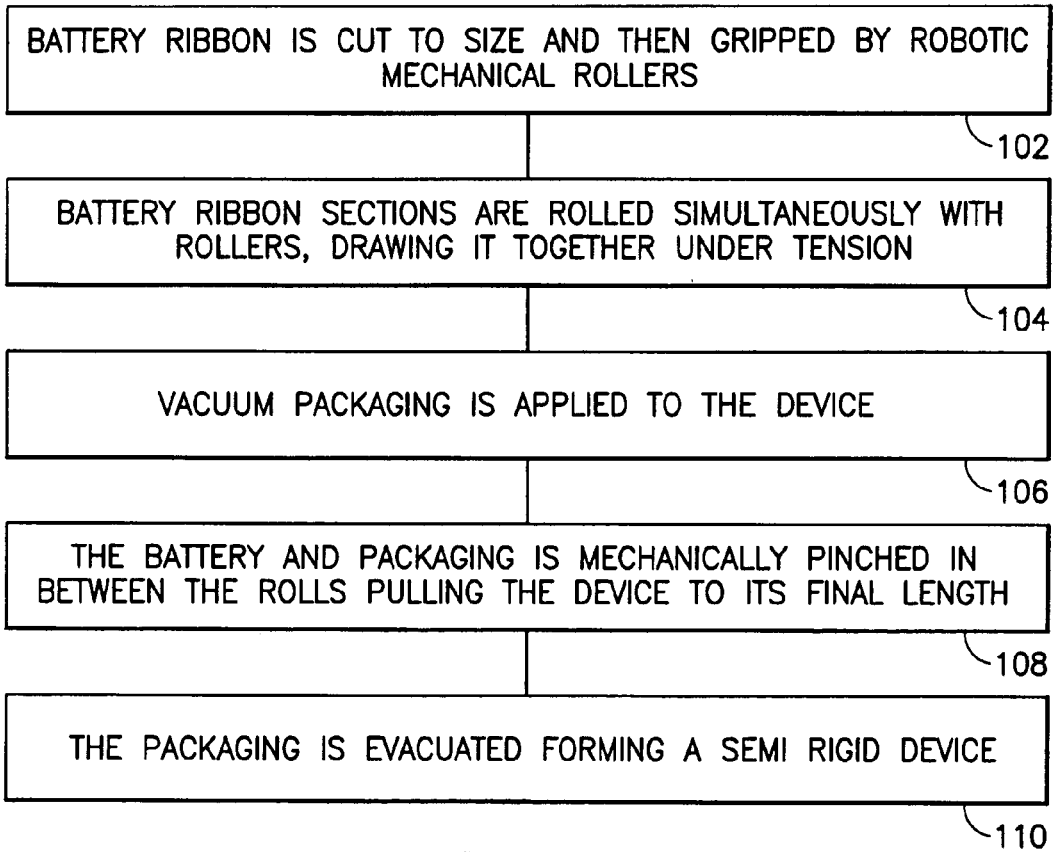
FIG. 8 is a block diagram of the exemplary method shown in FIG. 7.
Figure 7:
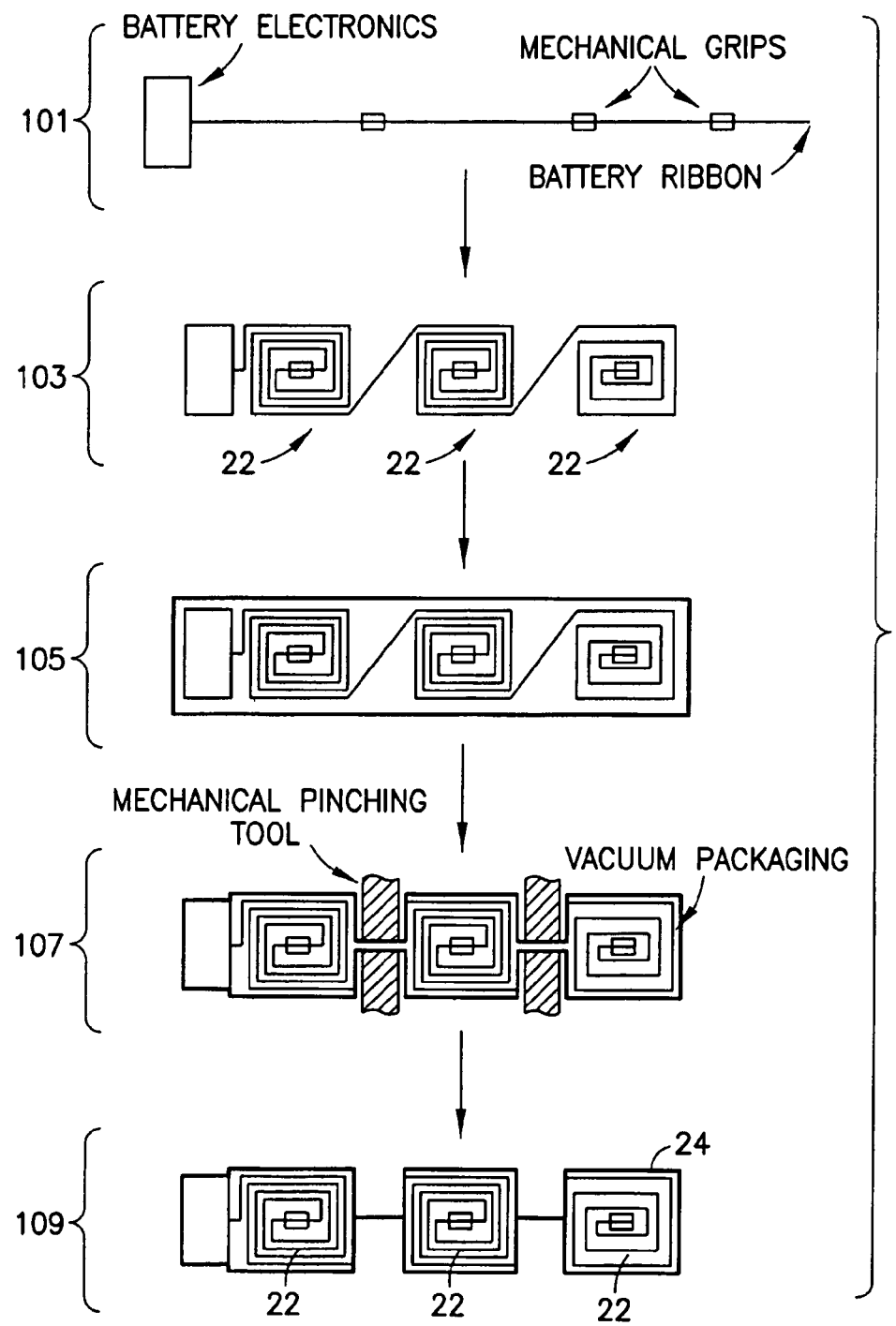
FIG. 7 is an illustration of an exemplary method of fabricating the flexible battery there is shown one exemplary method to fabricate the flexible battery.

Referring now also to FIGS. 7 and 8, there is shown one exemplary method to fabricate the flexible battery 10. The battery ribbon is cut to size and then gripped by robotic mechanical rollers (see 101 at FIG. 7, and block 102 at FIG. 8). The battery ribbon sections are rolled simultaneously with rollers, drawing it together under tension (see 103 at FIG. 7, and block 104 at FIG. 8). Vacuum packaging is applied to the device (see 105 at FIG. 7, and block 106 at FIG. 8). The battery and packaging is mechanically pinched in between the rolls pulling the device to its final length (see 107 at FIG. 7, and block 108 at FIG. 8). The middle connecting portions of the vacuum packaging are configured to contact a first side of the interconnecting portion 15 and a second opposite side of the interconnecting portion 15 (as shown in FIG. 7). The packaging is evacuated forming a semi rigid device (see 109 at FIG. 7, and block 110 at FIG. 8). It should be noted that term 'semi rigid device' is provided as a non-limiting term and is provided to describe that, according to some exemplary embodiments of the invention, the individual rolls 22 themselves may be substantially rigid while the overall battery is a flexible structure, such as by being substantially flexible at the areas proximate to the interconnecting portions 15.

Figure 9:
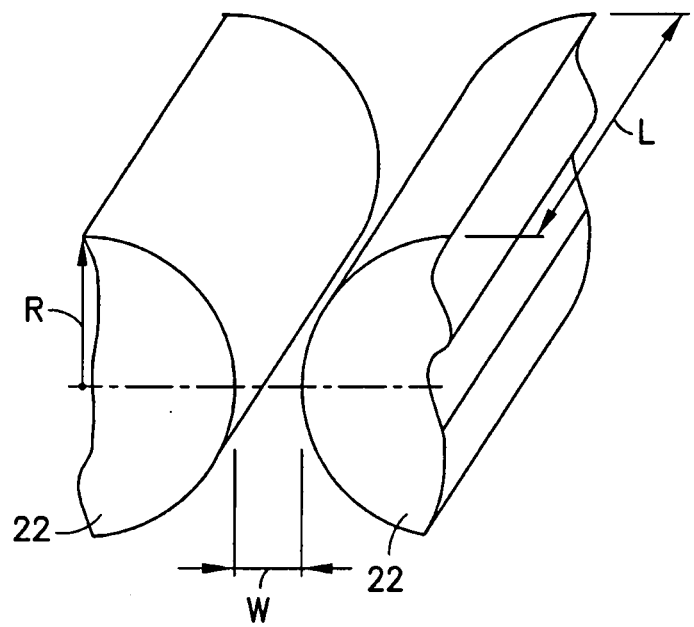
FIG. 9 is a partial view illustrating a gap between two rolls of the flexible battery shown in FIG. 1.

The grooves resulting from the fashioning of a "battery ribbon" into the multiple-roll structure mean that there is an associated reduction in the volume contributing to energy storage as compared to a conventionally structured battery (i.e. compared to the minimum-sized cuboid which encloses the multiple-roll structure completely.) To estimate the volume reduction and feasible bending radius for a multiple roll structure, it is generally necessary to consider the geometric shape of the groove. It is unlikely that the roll edge will be square and it is more likely they will be a semi-circle shape (as per the edges of a conventional battery, such as the Nokia BL-5J battery). If this is the case, then only a very small gap is required between the two rolls as the two sides will easily roll over each other (as shown in FIG. 9). It should be noted that the adoption of a structure with multiple adjacent rolls generally inevitably leads to the groove formation with concomitant reduction of the available overall battery volume. The representation (of the edge of two rolled battery sections with a separation gap [w]) shown in FIG. 9 allows assessment of the reduction in volume of the sealed device when grooves are added to the structure. The reduction in volume can be considered directly proportional to the reduction in energy that can be stored. FIG. 9 shows the join between two rolled sections. The reduction in volume per groove, $V_r$, can therefore be described by equation (1) below.

$$V_r = L((4R^2 - \pi R^2) + 2RW) \quad (1)$$

Where:
R=the radius at the edge of the roll (m),
W=the width of the separation (m),
L=the length of the groove (m).

The total change in battery volume can then be calculated from equation (2) below.

$$\% \text{ volume change} = 100 \times (V_1 - V_2 / V_1) \quad (2)$$

$$V_2 = NV_r \quad (3)$$

Where $V_1$=initial volume of a cuboid battery,
$V_2$=volume after the addition of grooves,
N=number of rolls.

Figure 10:
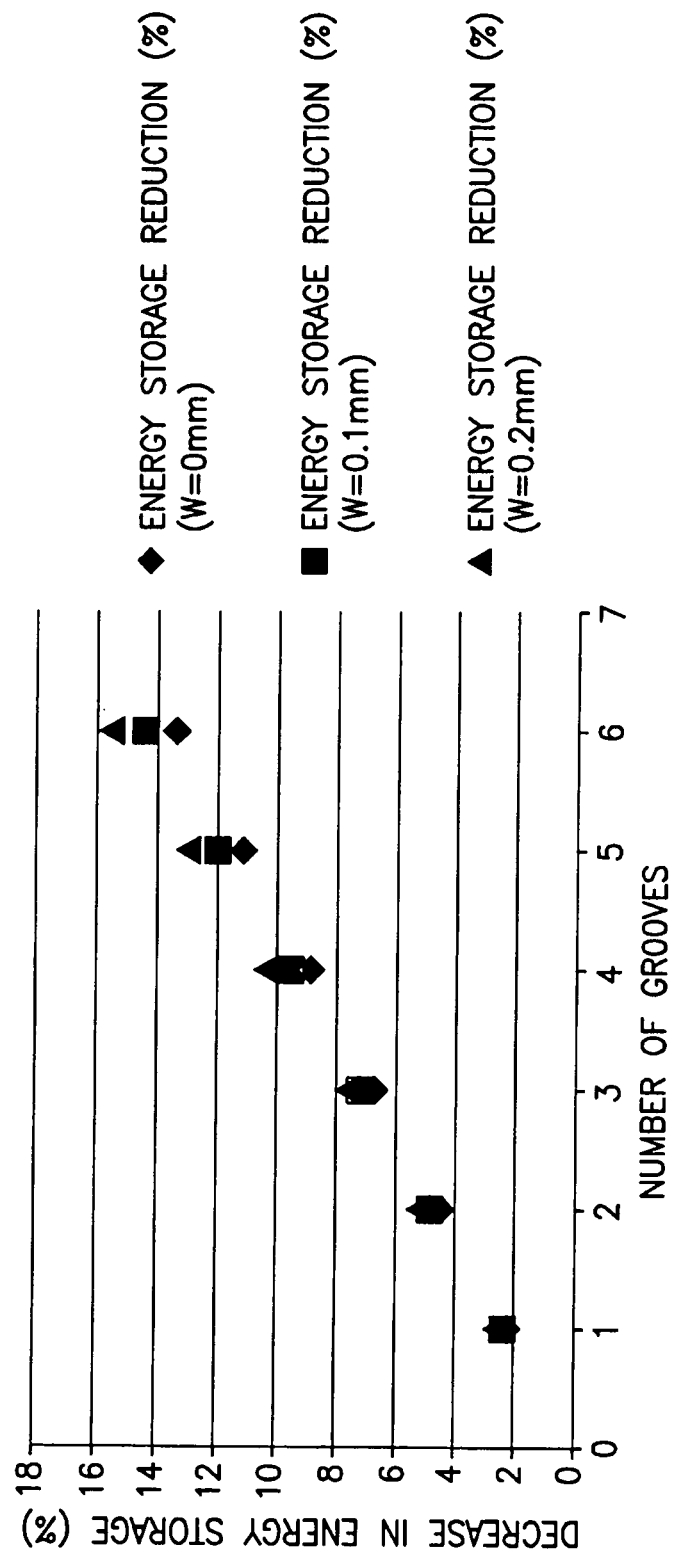
FIG. 10 is a an exemplary graph of the energy storage reduction for the flexible battery shown in FIG. 1.

Referring now also to FIG. 10, there is shown a graph of the energy storage reduction for the flexible battery 10. The graph includes an analysis of percent reduction in energy storage for a battery with different number of grooves and spacings between rolled sections. This section briefly assesses the energy storage penalty for adding flexibility to a battery, through the addition of grooves, with rounded edges for both types of swiss roll design (for example the swiss roll configurations shown in FIGS. 2 and 4, for example). According to one example embodiment of the invention, the volume of the flexible battery, or the device, is=T (thickness)×L (length)×W (width)=6×58×37=12876 mm³. The graph in FIG. 10 illustrates the potential energy reduction for the number of grooves placed across the width of a battery having the above dimensions. The number of grooves required is highly dependent upon the design of the overall mobile device. However, for the swiss roll configuration shown in FIG. 3, approximately nine grooves would be required, resulting in a reduction of energy of approximately 20% (w=0, from FIG. 10). However, if each roll is made flatter, rather than circular, the reduction can be minimized, although increasing the length of the rigid sections. The overall flexibility/energy density will be a function of the particular device.

According to some embodiments of the invention, the configuration shown in FIG. 3 provides an optimal design; however, the number of grooves depends specifically on the overall device design, which the battery is to be placed into.

Figure 11:
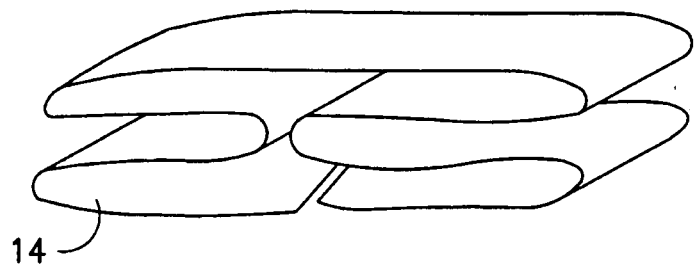
FIG. 11 is a view illustrating another example of a stack of the flexible battery shown in FIG. 1.
Figure 12:
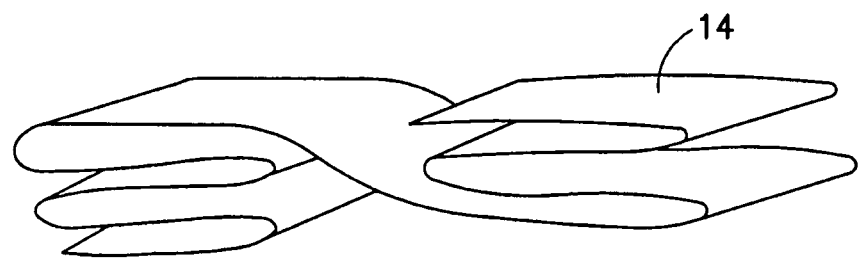
FIG. 12 is a view illustrating another example of a stack of the flexible battery shown in FIG. 1.
Figure 13:
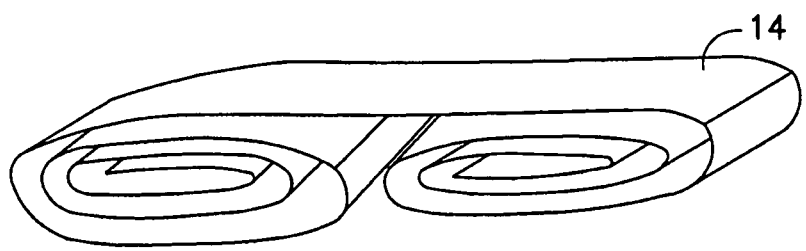
FIG. 13 is a view illustrating another example of a stack of the flexible battery shown in FIG. 1.

It should be noted that although various exemplary embodiments of the invention have been described in connection with the rolled structures (or blocks) shown in FIGS. 1-4, any other suitable type of rolled structures may be provided. For example, various other methods of rolling or folding the battery ribbon would be compatible with the vacuum packaging method described above. Additionally, the other possible ways to fold the anode/separator/cathode stack would also allow for mechanically flexible points within rigid structures. For example, according to some embodiments of the invention, the flexible battery may include a stack having single layer to fold as shown in FIG. 11. For example, according to some embodiments of the invention, the flexible battery may include a stack having a fold in the neutral plane as shown in FIG. 12. For example, according to some embodiments of the invention, the flexible battery may include a stack having rolled structures connected at top of the rolls as shown in FIG. 13.

Figure 14:
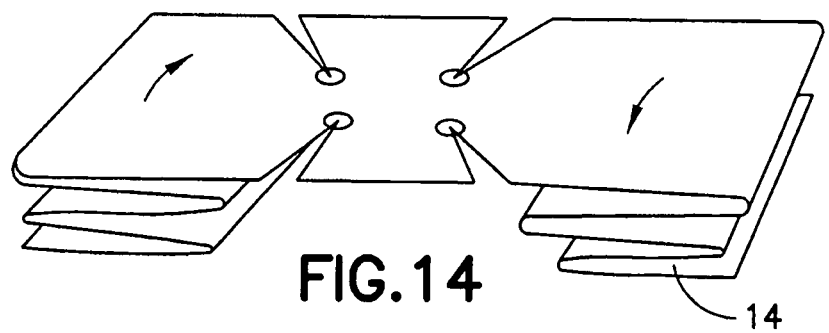
FIG. 14 is a view illustrating another example of a stack of the flexible battery shown in FIG. 1.
Figure 15:
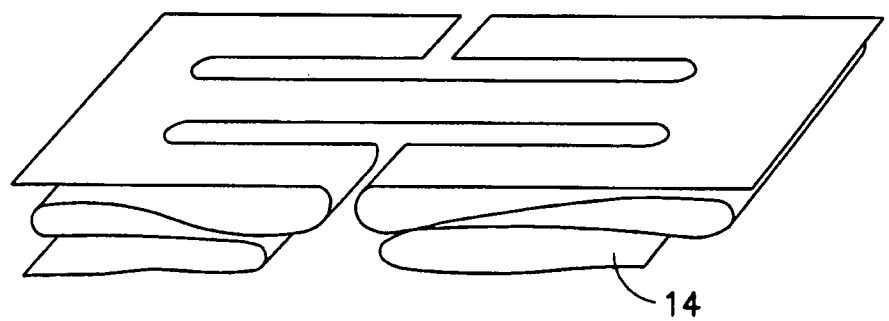
FIG. 15 is a view illustrating another example of a stack of the flexible battery shown in FIG. 1.

Additionally, according to some other embodiments of the invention, there are further methods of rolling the battery ribbon which further account for torsion, and provide further ways of folding the anode/separator/cathode stack and grooves/cuts which can be placed in them to minimize stresses upon twisting, as well as bending. When considering a beam analysis, in general a narrower (or thinner) cross section provides for improved torsion over wider (or thicker) cross sections. For example, according to some embodiments of the invention, the flexible battery may include a stack having angled cut out sections (with stress relief holes) to provide a thinner center cross section with improved torsion capabilities as shown in FIG. 14. For example, according to some embodiments of the invention, the flexible battery may include a stack having cut out sections parallel to the side edges to provide a thinner center cross section with improved torsion capabilities as shown in FIG. 15.

Figure 16:
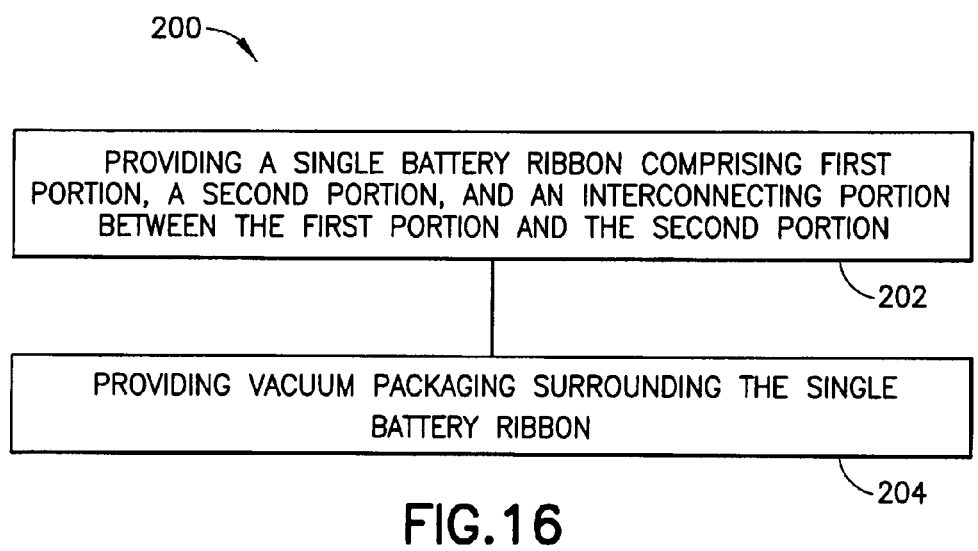
FIG. 16 is a block diagram of another exemplary method of the flexible battery shown in FIG. 1.

FIG. 16 illustrates a method 200. The method 200 includes providing a single battery ribbon comprising first portion, a second portion, and an interconnecting portion between the first portion and the second portion, wherein the first portion comprises a first rolled block, wherein the second portion comprises a second rolled block, and wherein the first portion, the second portion, and the interconnecting portion form a continuous single layer comprising an anode and a cathode (at block 202). Providing vacuum packaging surrounding the single battery ribbon, wherein the vacuum packaging comprises a middle connecting portion configured to contact a first side of the interconnecting portion and a second opposite side of the interconnecting portion (at block 204). It should be noted that the illustration of a particular order of the blocks does not necessarily imply that there is a required or preferred order for the blocks and the order and arrangement of the blocks may be varied. Furthermore it may be possible for some blocks to be omitted.

Without in any way limiting the scope, interpretation, or application of the claims appearing below, a technical effect of one or more of the example embodiments disclosed herein is providing a single ribbon battery having a number of different rigid sections (such as the rolled structures, for example) to allow the device to bend and twist without damaging the active layer in the battery. Another technical effect of one or more of the example embodiments disclosed herein is providing a battery wherein at the linked sections of the battery ribbon the anode, cathode and separator materials are continuous, however, the active material can be removed and could be replaced with a dielectric material. Another technical effect of one or more of the example embodiments disclosed herein is providing a battery wherein at the linked sections of the battery ribbon the anode, cathode and separator materials are continuous, however, the active material can be provided only at a central portion (such as spaced from the edges) of the interconnecting portion of the battery ribbon. Another technical effect of one or more of the example embodiments disclosed herein is that the width of the connecting ribbons maybe reduced to allow twisting of the battery (if required in the application). Another technical effect of one or more of the example embodiments disclosed herein is that a pouch cell is used to vacuum pack the battery ribbon and during manufacture the linked sections of the battery ribbon along with the layers of the pouch cell can be compressed together under evacuation to form a thin composite of films able to withstand flexure and twisting.

Technical effects of any one or more of the exemplary embodiments provide flexibility but also reduces packaging costs when compared to conventional configurations having multiple round cells stored in a flexible frame, for example. Additionally, many of the conventional energy storage devices, such as conventional batteries, typically consist of tightly wound electrode layers in order to maximize volumetric energy density and this inevitably leads to batteries having the form of a rigid block. The accommodation of such bulky objects is a significant limitation in the design of new device forms, and new applications exist where this traditional battery (rigid block) form factor is not acceptable. One particular example pertains to dynamically flexible devices where the energy storage is required to be flexible in order to conform to the overall device flexure. The individual layers in conventional batteries are themselves generally relatively flexible, but stresses resulting from interlayer friction during bending and interlayer binding limit the flexibility of the overall structure.

Additionally, some attempted improvements in conventional batteries have produced thin, flexible batteries, however, such flexibility is a result of a very thin, single-layer construction which results in very limited storage capacities (typically a few 10s of mAh), which is generally not sufficient to carve out meaningful applications in mobile phones.

Further, some conventional batteries have included pouch cell battery packaging to replace the outer casing with a foil membrane, reducing the packaging volume of batteries, although the high packing density means that the resulting batteries are still rigid.

Additionally, some other attempted improvements in conventional batteries have been directed to electrode stacks, although flexibility was not previously significantly improved. For example, some conventional configurations include individual anodes and cathodes, shaped in such a way that when folded, will form a stack. However, firstly, the anode and cathode are folded individually to form the battery stack, complicating the manufacturing procedure. Secondly, and more importantly, the resulting cell from this method is a rigid block cell.

In another conventional battery example, the individual stacks are rolled, however, in the conventional designs this forms a rigid cell.

In another conventional battery example, the array of discrete nodes (cells) which can be electrically connected in series/parallel to obtain various combinations of outputs which might be needed. Although some degree of mechanical flexibility is provided, the structure suffers a significant energy density loss (Estimated to be >70%). As a result, the overall energy is too low for mobile applications.

Technical effects of one or more of the example embodiments disclosed herein is providing a single block cell including one single battery, but designed in such a way as to allow it to have high energy and mechanical flexibility. Another technical effect of one or more of the example embodiments disclosed herein is providing a single, continuous cell, divided into multiple rigid and flexible parts. Other technical effects of one or more of the example embodiments disclosed herein is allowing the use of state of the art active materials and are not dependent upon the material being able to withstand large strains, for example various exemplary embodiments are compatible with the latest materials and likely to be compatible with future materials. In particular: Leaf Spring structure—which results in an overall flexible device, with no rigid parts, but the requirement to place elastomer between the layers reduces the overall energy density. Swiss roll structure: —wherein most of these structures provide a single or multiple points of bending, allowing one to maintain the energy density at the rigid parts and still permitting bending. This can permit semi-rigid device designs but may be limited to bending in one direction. Torsion designs which permit bending in 2 directions (i.e. twisting) while maintaining the energy density in each of the solid blocks.

Various exemplary embodiments of the invention provide alternative battery designs which allow mechanical flexibility and hence permit their use in mechanically conformable device form factors. A technical effect of one or more of the example embodiments disclosed herein is providing mechanical flexure tolerant batteries via variations in the mechanical design of standard battery materials. Various exemplary embodiments of the invention provide for a single ribbon battery to be formed into a number of different rigid sections in such a manner as to allow the device to bend and twist, without damaging the active layer in the battery.

It should be understood that components of the invention can be operationally coupled or connected and that any number or combination of intervening elements can exist (including no intervening elements). The connections can be direct or indirect and additionally there can merely be a functional relationship between components.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (for example, any combination that is suitable, practicable and/or feasible) and are not limited only to those combinations described herein and/or included in the appended claims.

In one exemplary embodiment, an apparatus comprising: a single battery ribbon comprising first portion, a second portion, and an interconnecting portion between the first portion and the second portion, wherein the first portion comprises a first block, wherein the second portion comprises a second block, and wherein the first portion, the second portion, and the interconnecting portion form a continuous single layer comprising an anode and a cathode; and vacuum packaging surrounding the single battery ribbon, wherein the vacuum packaging comprises a middle connecting portion configured to contact a first side of the interconnecting portion and a second opposite side of the interconnecting portion.

An apparatus above, wherein the apparatus comprises a mechanical flexure tolerant battery.

An apparatus above, wherein the single battery ribbon further comprises a separator between the anode and cathode.

An apparatus above, wherein the interconnecting portion is free of any active material.

An apparatus above, wherein the first block and the second block each comprise a swiss roll structure.

An apparatus above, wherein the first block and the second block each comprise a folded stack structure.

An apparatus above, wherein the single battery ribbon further comprises N blocks and N−1 interconnecting portions, to form the continuous single layer.

An apparatus above, wherein the middle connecting portion of the vacuum packaging is configured to be compressed together with the interconnecting portion of the single battery ribbon under an evacuation process.

An apparatus above, wherein the interconnecting portion comprises a narrower width than the first and second blocks.

An apparatus above, wherein the interconnecting portion comprises a smaller cross section than the first portion and the second portion of the single battery ribbon.

An apparatus above, wherein the blocks comprise a general cylindrical shape.

An apparatus above, wherein the blocks comprise a general rectangular shape.

In another exemplary embodiment, a method, comprising: gripping a battery ribbon with mechanical rollers; rolling battery ribbon sections with the rollers; applying vacuum packaging to the rolled battery ribbon sections; pinching in between the rolled battery ribbon sections; and performing an evacuation process on the vacuum packaging.

The method as above wherein the battery ribbon sections are rolled simultaneously.

The method as above wherein the pinching further comprises mechanically pinching in between the rolled battery ribbon sections.

The method as above wherein the evacuation process evacuates the atmosphere from a pouch cell.

The method as above wherein the vacuum packaging substantially surrounds the entire circumference of the rolled battery ribbon sections.

In another exemplary embodiment, a method comprising: providing a single battery ribbon comprising first portion, a second portion, and an interconnecting portion between the first portion and the second portion, wherein the first portion comprises a first rolled block, wherein the second portion comprises a second rolled block, and wherein the first portion, the second portion, and the interconnecting portion form a continuous single layer comprising an anode and a cathode; and providing vacuum packaging surrounding the single battery ribbon, wherein the vacuum packaging comprises a middle connecting portion configured to contact a first side of the interconnecting portion and a second opposite side of the interconnecting portion.

The method as above wherein the single battery ribbon further comprises a third portion and another interconnecting portion between the third portion and the second portion, wherein the third portion comprises a third rolled block and wherein the first portion, the second portion, the interconnecting portion, the third portion, and the another interconnecting portion form the continuous single layer.

The method as above wherein the interconnecting portion comprises a smaller cross section than the first portion and the second portion of the single battery ribbon.

In another exemplary embodiment, a method is disclosed of providing mechanical flexure tolerant batteries. A single ribbon battery is formed into a number of different rigid sections in such a manner as to allow the device to bend and twist without damaging the active layer in the battery. At the linked sections of the battery ribbon anode, cathode and separator materials are continuous however the active material is removed and can be replaced with a dielectric material. Width of the connecting ribbons is reduced to allow twisting of the battery. A pouch cell is used to vacuum pack the battery ribbon. The linked sections of the battery ribbon along with the layers of the pouch cell are compressed together under evacuation to form a thin composite of films able to withstand flexure and twisting.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a single battery ribbon comprising a first portion, a second portion, and an interconnecting portion between the first portion and the second portion, wherein the first portion comprises a first rolled structure, wherein the second portion comprises a second rolled structure, wherein the first portion, the second portion, and the interconnecting portion form a continuous single layer comprising an anode and a cathode, wherein the interconnecting portion is free of any active material, wherein the first and second rolled structures are configured to be formed by turning the single battery ribbon over itself, wherein the first rolled structure is formed from only the single battery ribbon, and wherein the second rolled structure is formed from only the single battery ribbon, wherein the single battery ribbon further comprises a separator between the anode and cathode, and wherein each of the anode, cathode, and separator of the single battery ribbon are configured to each be physically continuous along substantially an entire longest dimension of the single battery ribbon; and
vacuum packaging surrounding the single battery ribbon, wherein the vacuum packaging comprises a middle connecting portion configured to contact a first side of the interconnecting portion and a second opposite side of the interconnecting portion.

2. An apparatus as in claim 1 wherein the apparatus comprises a mechanical flexure tolerant battery.

3. An apparatus as in claim 1 wherein the first rolled structure and the second rolled structure each comprise a swiss roll structure.

4. An apparatus as in claim 1 wherein the first rolled structure and the second rolled structure each comprise a folded stack structure.

5. An apparatus as in claim 1 wherein the single battery ribbon further comprises N rolled structures and N−1 interconnecting portions, to form the continuous single layer.

6. An apparatus as in claim 1 wherein the middle connecting portion of the vacuum packaging is configured to be compressed together with the interconnecting portion of the single battery ribbon under an evacuation process.

7. An apparatus as in claim 1 wherein the interconnecting portion comprises a narrower width than the first and second rolled structures.

8. An apparatus as in claim 1 wherein the interconnecting portion comprises a smaller cross section than the first portion and the second portion of the single battery ribbon.

9. An apparatus as in claim 1 wherein the rolled structures comprise a general cylindrical shape.

10. An apparatus as in claim 1 wherein the rolled structures comprise a general rectangular shape.

11. An apparatus as in claim 1 wherein the anode of the single battery ribbon comprises a continuous material.

12. An apparatus as in claim 1 wherein the cathode of the single battery ribbon comprises a continuous material.

\* \* \* \* \*